US012060202B2

(12) United States Patent
McLeod et al.

(10) Patent No.: US 12,060,202 B2
(45) Date of Patent: Aug. 13, 2024

(54) TAPERED END CONTAINERS

(71) Applicant: WestRock Shared Services, LLC, Atlanta, GA (US)

(72) Inventors: Michael McLeod, Romeoville, IL (US); Timothy L. McCarthy, Wilmette, IL (US); Jeffrey S. James, Elmhurst, IL (US)

(73) Assignee: WestRock Shared Services, LLC, Atlanta, GA (US)

( * ) Notice: Subject to any disclaimer, the term of this patent is extended or adjusted under 35 U.S.C. 154(b) by 0 days.

(21) Appl. No.: 16/952,867

(22) Filed: Nov. 19, 2020

(65) Prior Publication Data

US 2022/0153470 A1 May 19, 2022

(51) Int. Cl.

| | |
|---|---|
| ***B65D 5/28*** | (2006.01) |
| ***B31B 50/00*** | (2017.01) |
| ***B31B 50/26*** | (2017.01) |
| ***B31B 50/62*** | (2017.01) |
| ***B65D 5/20*** | (2006.01) |

(52) U.S. Cl.

CPC ............ *B65D 5/28* (2013.01); *B31B 50/0044* (2017.08); *B31B 50/262* (2017.08); *B31B 50/62* (2017.08); *B65D 5/2052* (2013.01)

(58) Field of Classification Search

CPC ........ B65D 5/28; B65D 5/2052; B65D 71/36; B65D 5/2047; B31B 50/0044; B31B 50/262

USPC ..... 229/126, 114, 915, 103.2; 206/427, 434, 206/485.1, 557; 220/23.87

See application file for complete search history.

(56) References Cited

U.S. PATENT DOCUMENTS 3,828,926 A * 8/1974 Rossi ..................... B65D 71/16 206/427
5,431,333 A * 7/1995 Lorenz ................... B65D 5/667 229/149
5,494,214 A * 2/1996 Fleury ................ B65D 71/0096 229/125
11,136,162 B2 * 10/2021 Foushee ............... B65D 5/2057
2019/0185201 A1 * 6/2019 McCarthy ................ B65D 5/16

* cited by examiner

*Primary Examiner* — Christopher R Demeree

(74) *Attorney, Agent, or Firm* — Neil G. Cohen; Rohini K. Garg

(57) ABSTRACT

A container includes a base panel. An opposed pair of end panels extends from the base panel at opposite ends of the base panel. A front panel extends from the base panel and extends from a first one of the end panels to a second one of the end panels. A back panel extends from the base panel and extends from the first one of the end panels to the second one of the end panels. The end panels taper so top edges of the front and back panels are either longer or shorter than bottom edges of the front and back panels. Each end panel includes a plurality of overlapping end flaps adhered to one another. The end flaps of each of the end panels are connected to a respective one of the base panel and each of the front and back panel at respective fold lines.

23 Claims, 16 Drawing Sheets

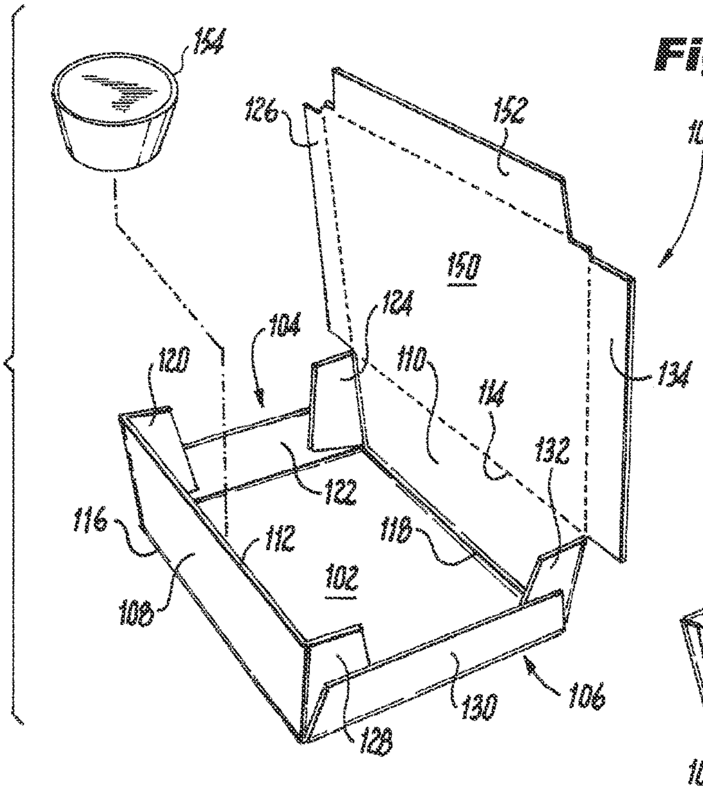
Fig. 1
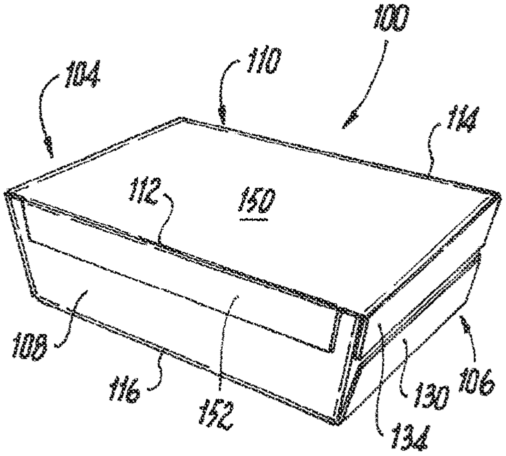
Fig. 2
Fig. 3
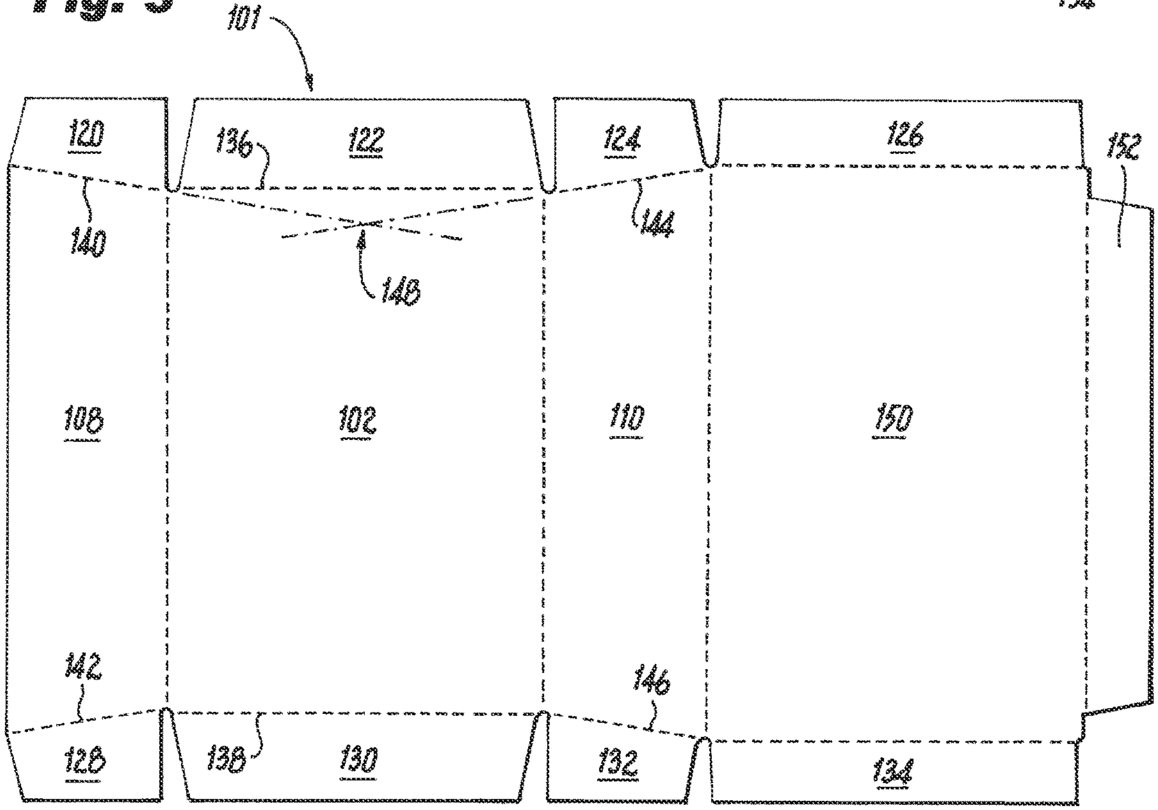

Fig. 4
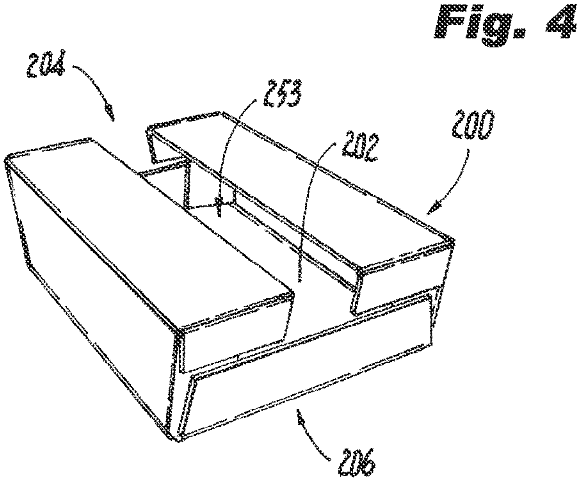
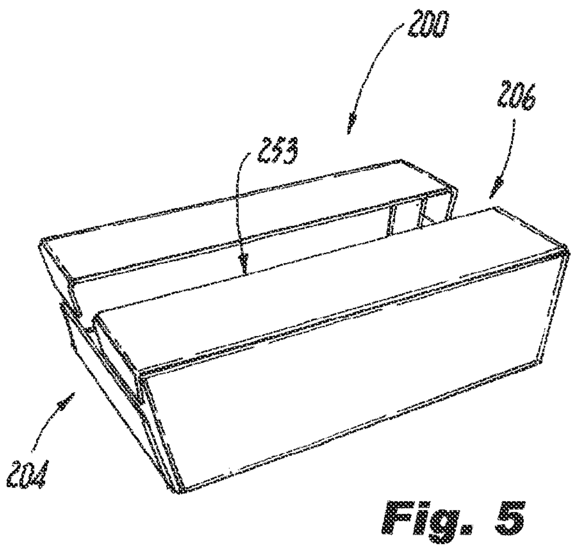
Fig. 5
Fig. 6
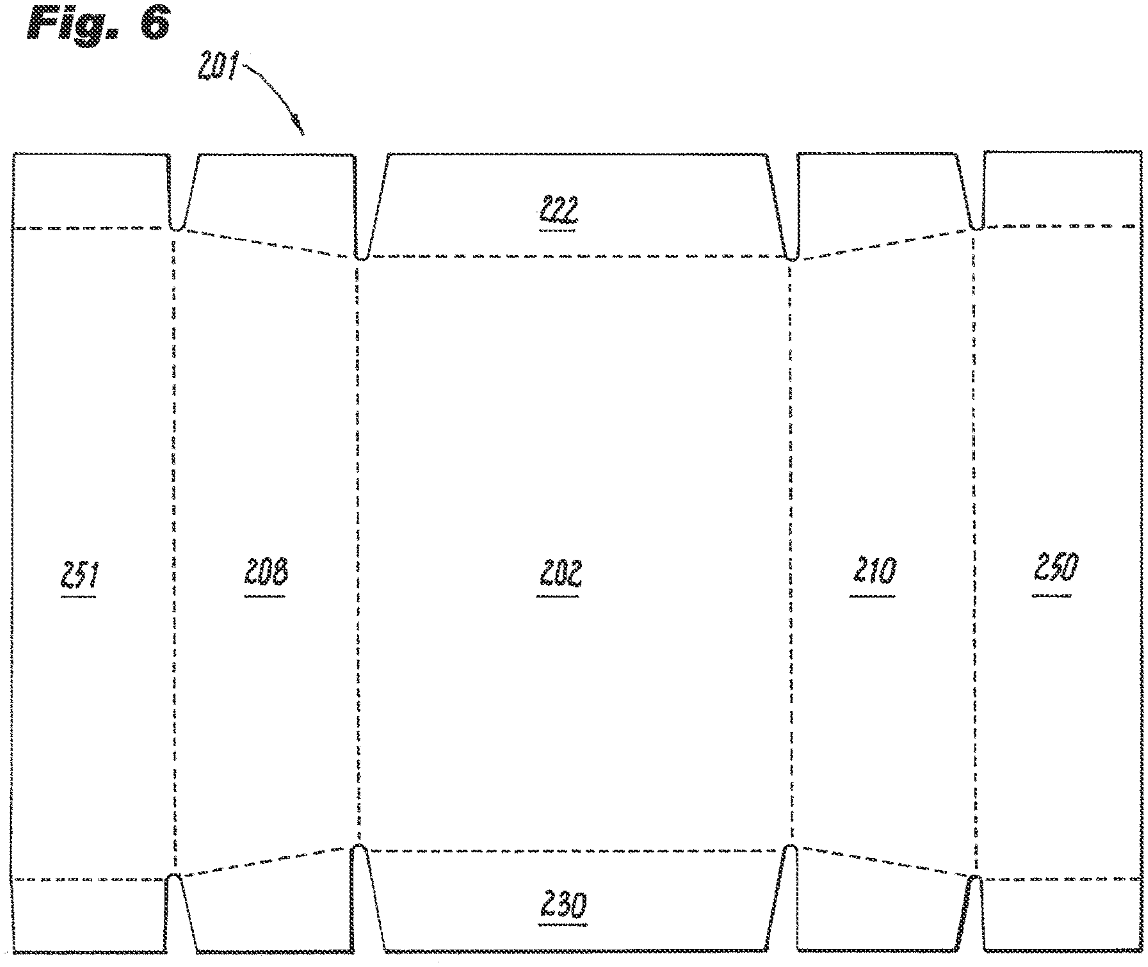

Fig. 7
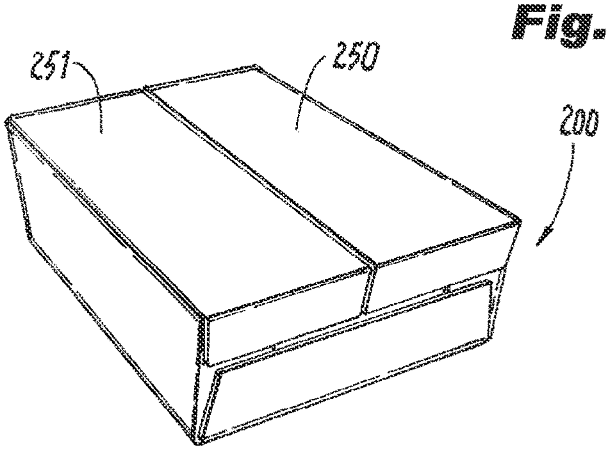
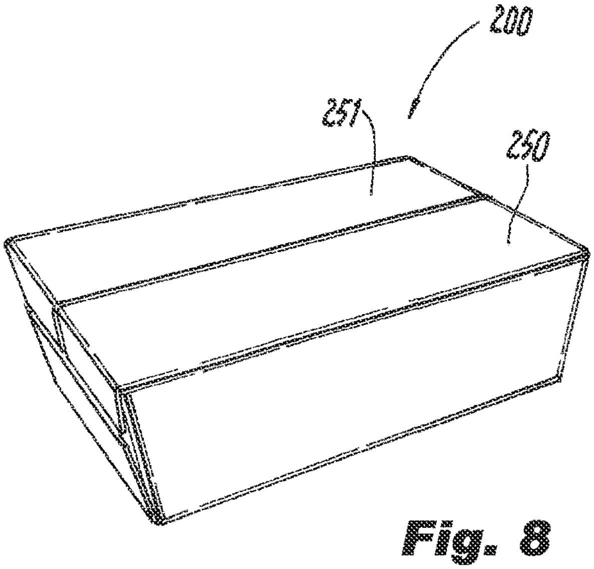
Fig. 8
Fig. 9
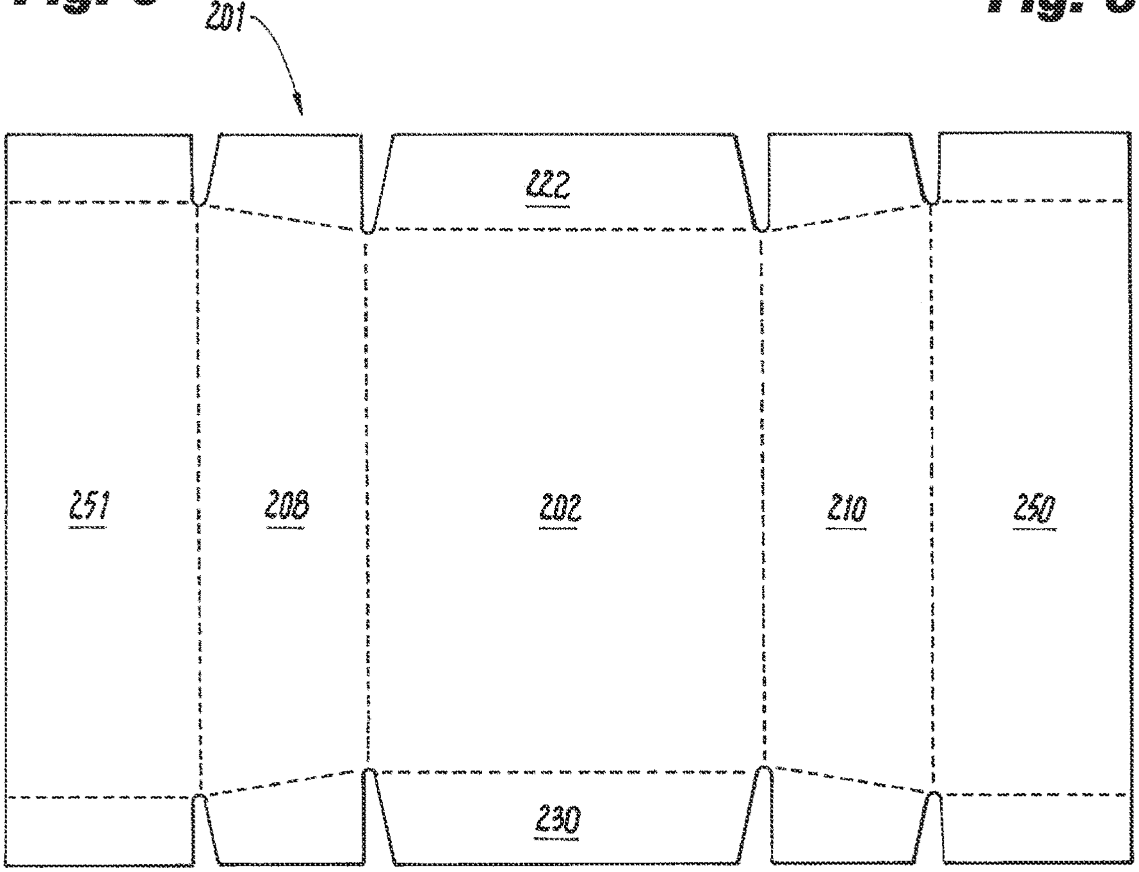

Fig. 10
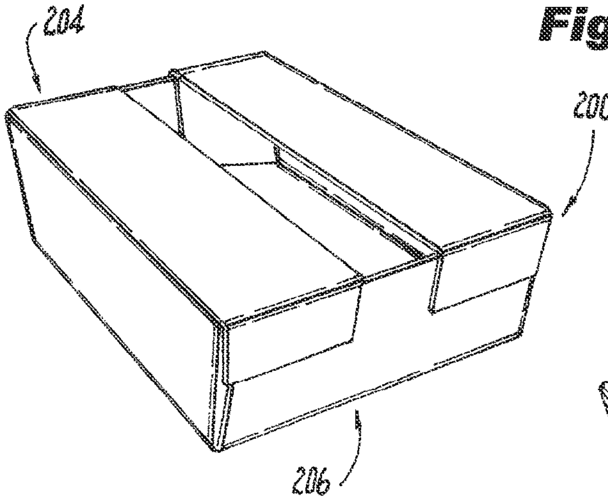
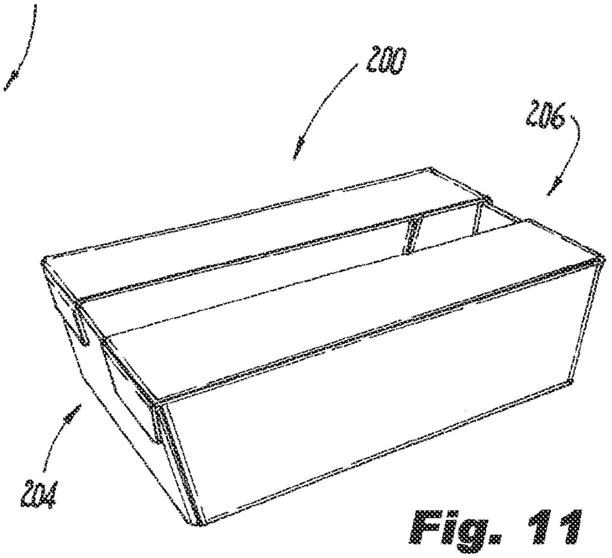
Fig. 11
Fig. 12
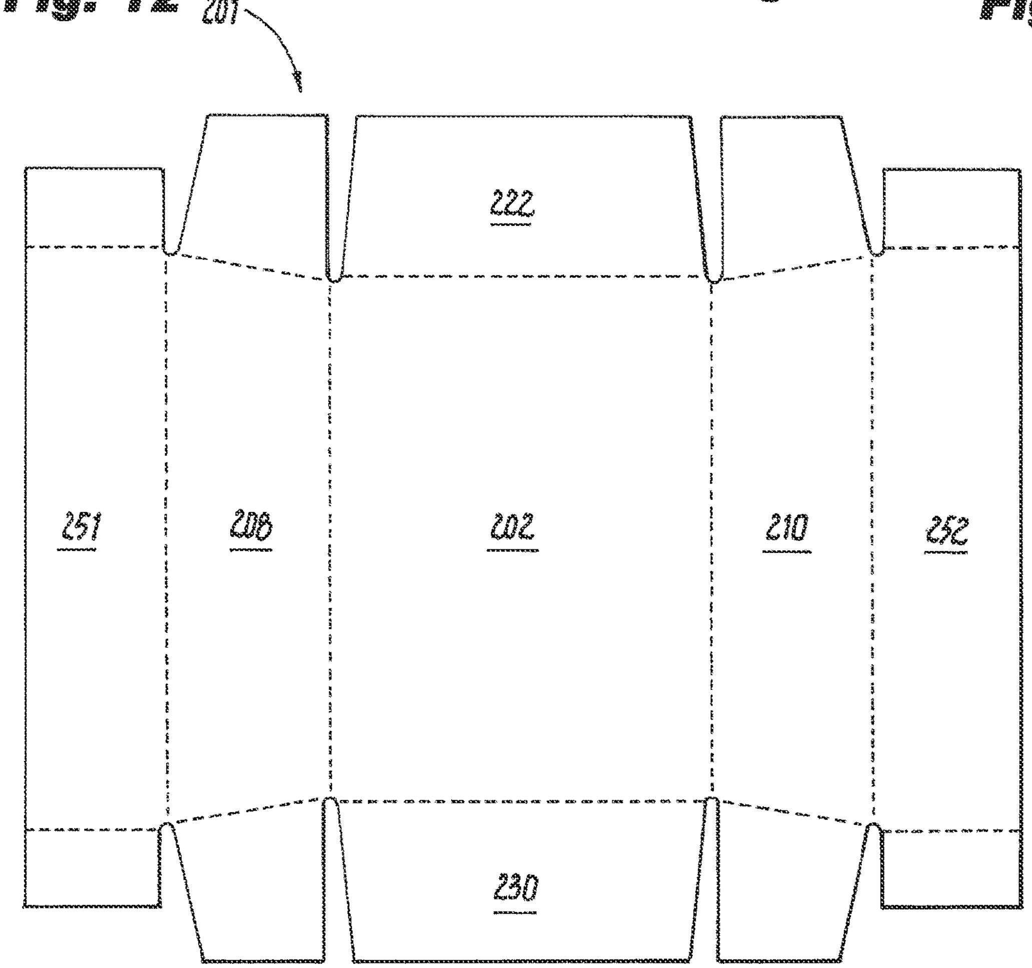

Fig. 13
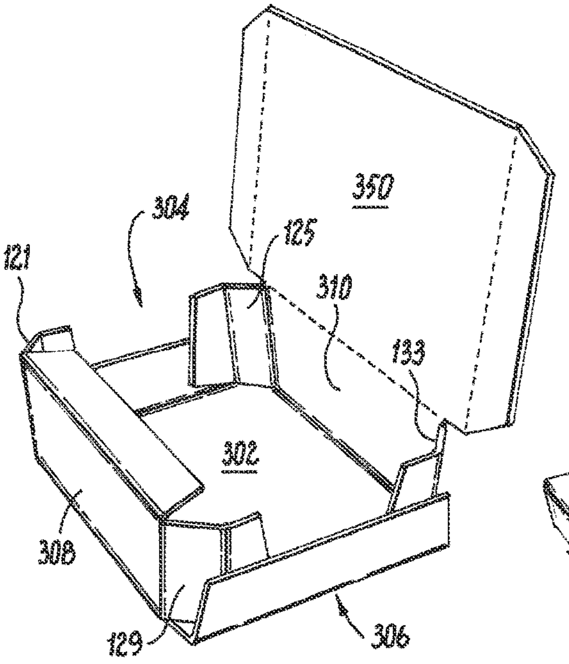
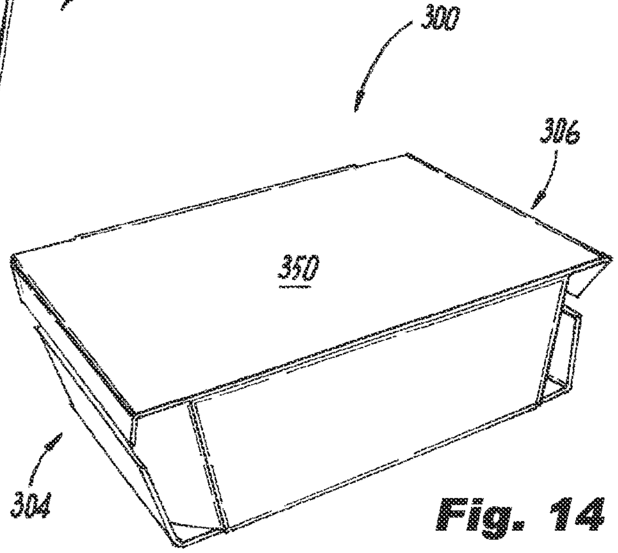
Fig. 14
Fig. 15
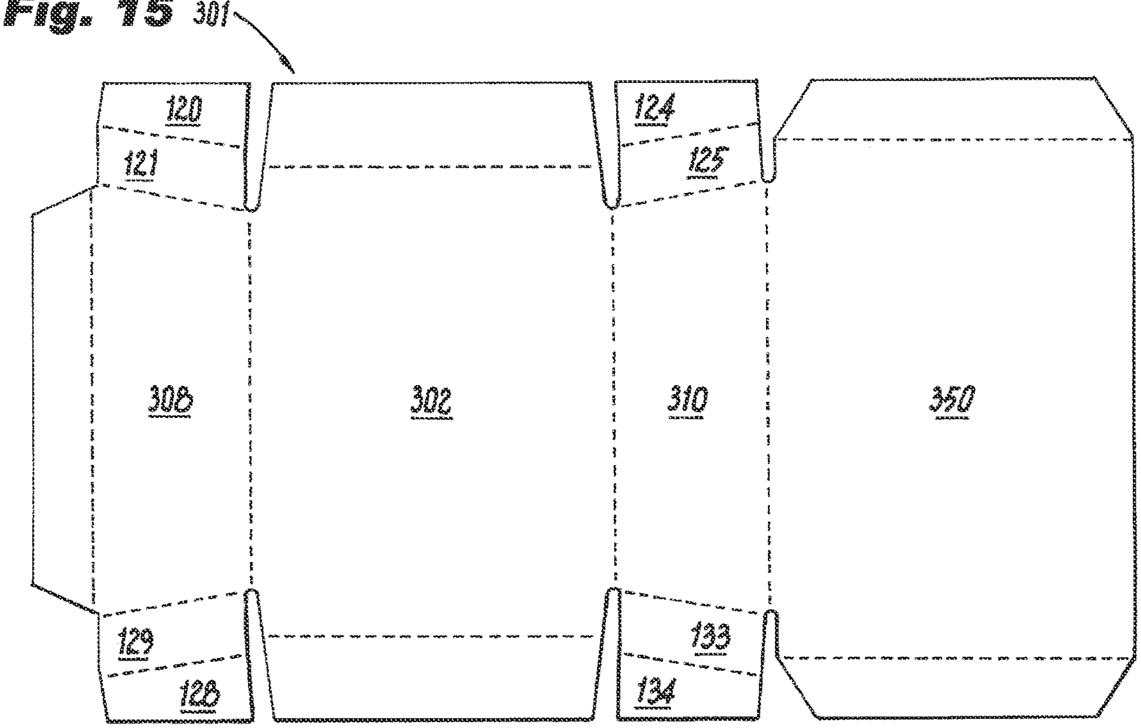

Fig. 16
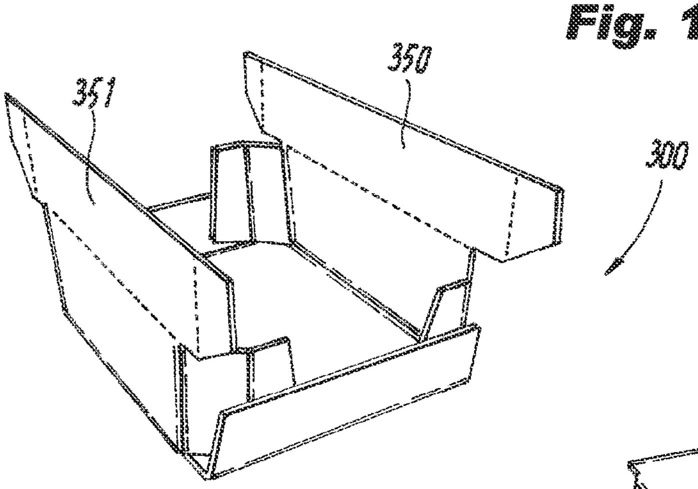
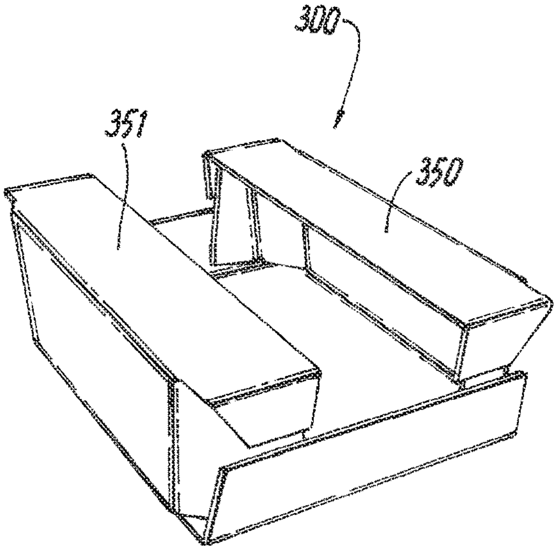
Fig. 17
Fig. 18
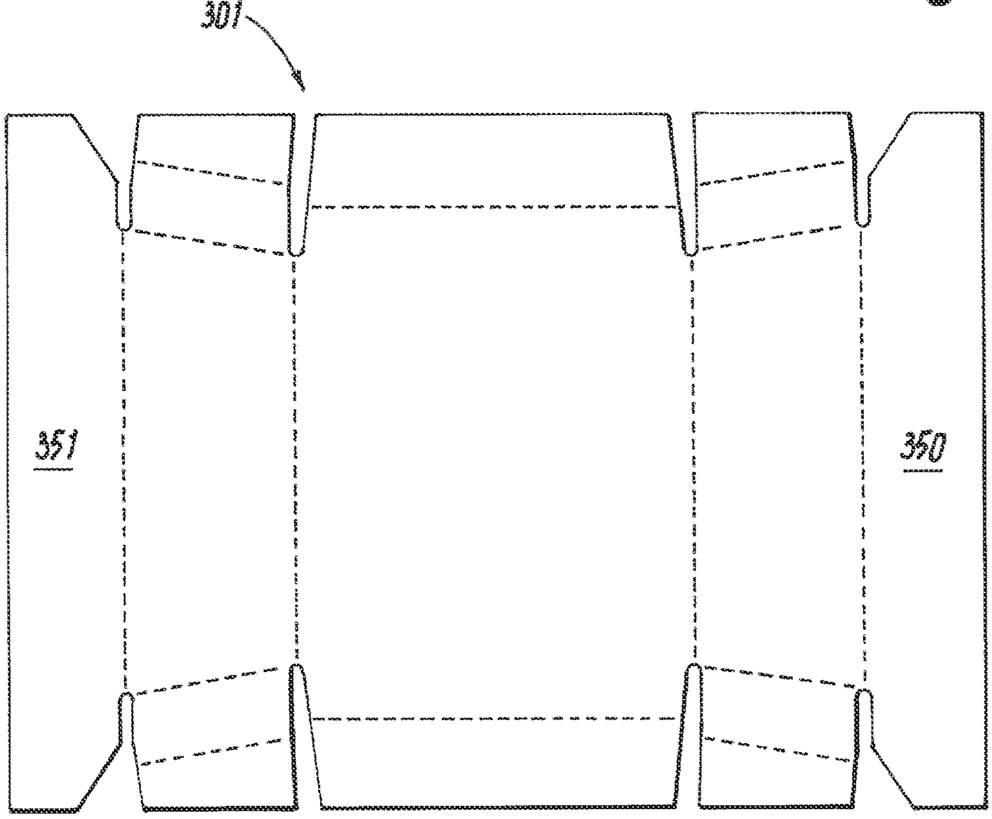

Fig. 19
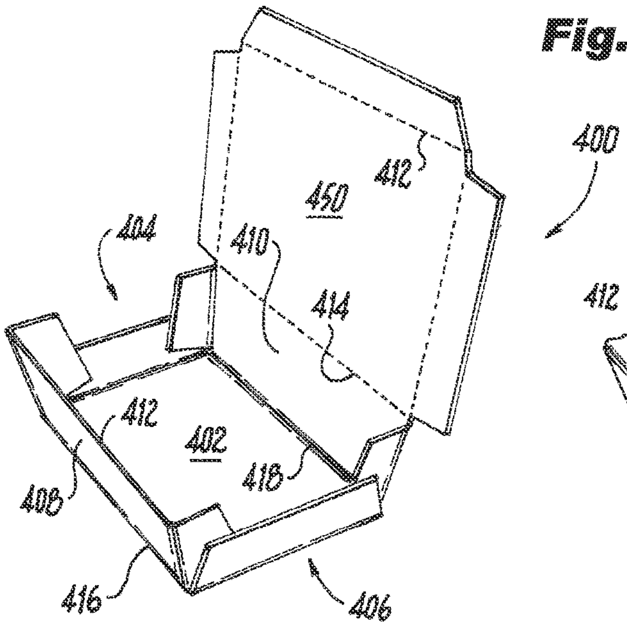
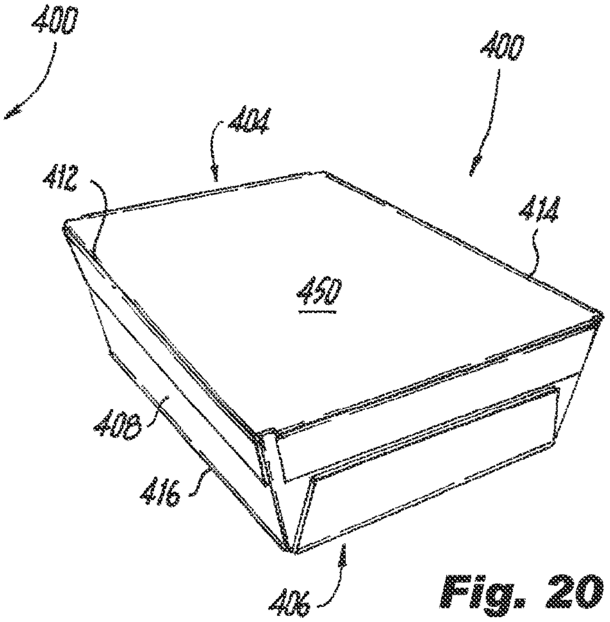
Fig. 20
Fig. 21
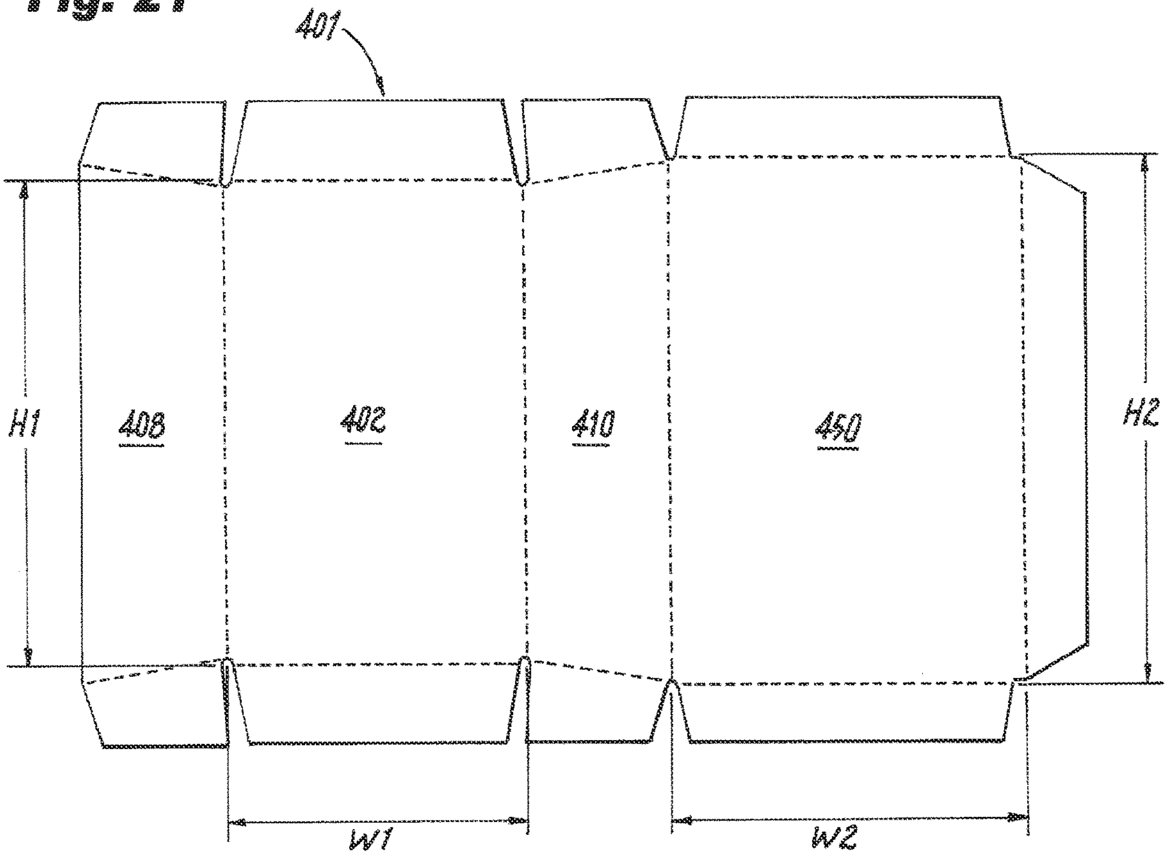

Fig. 22
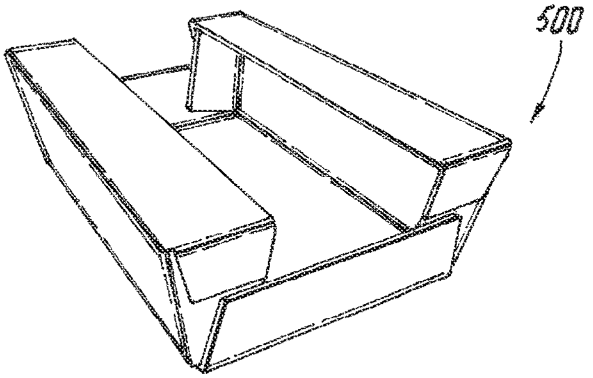
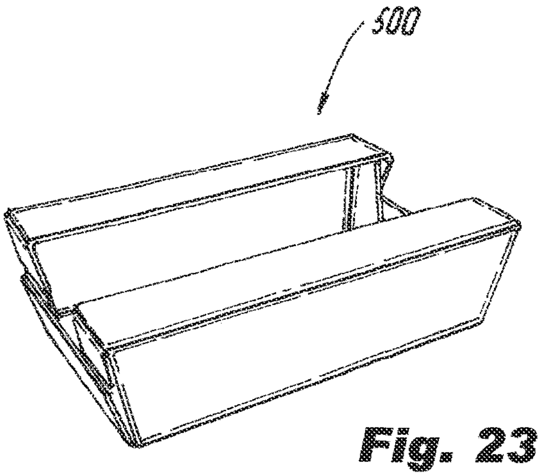
Fig. 23
Fig. 24
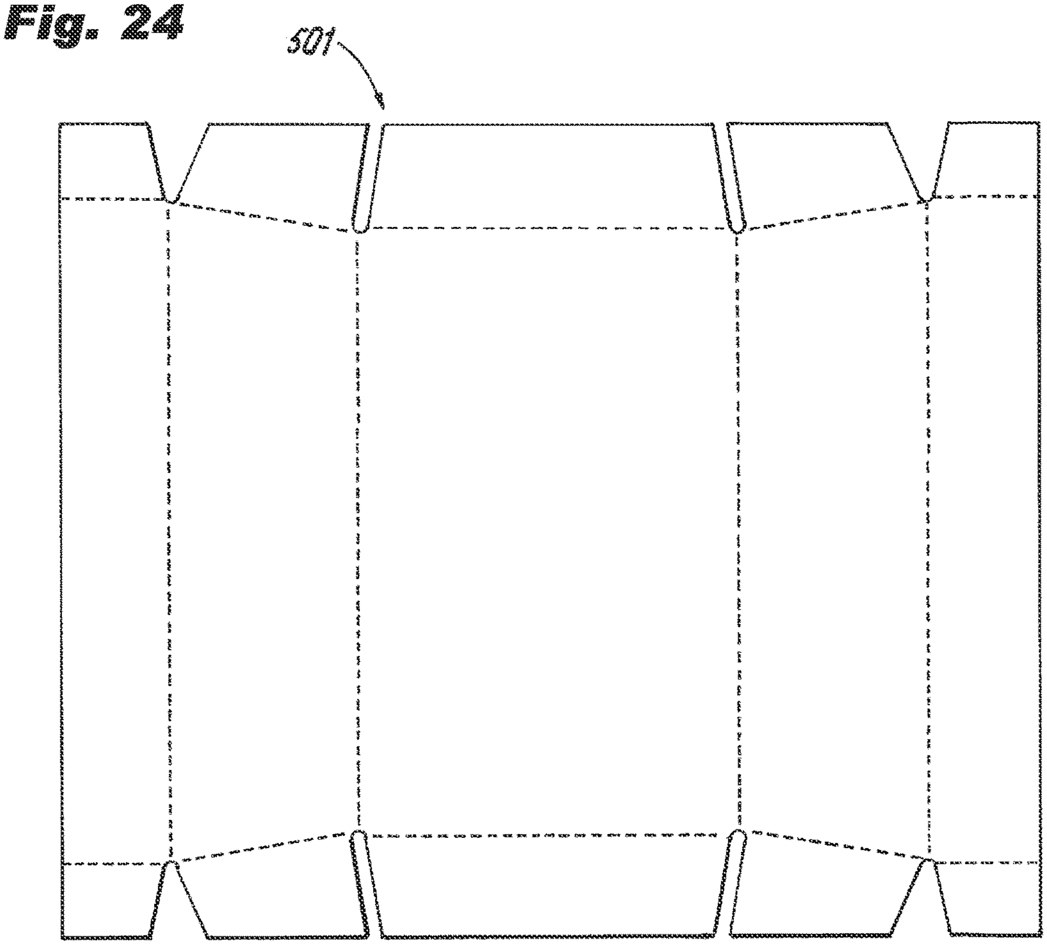

Fig. 25
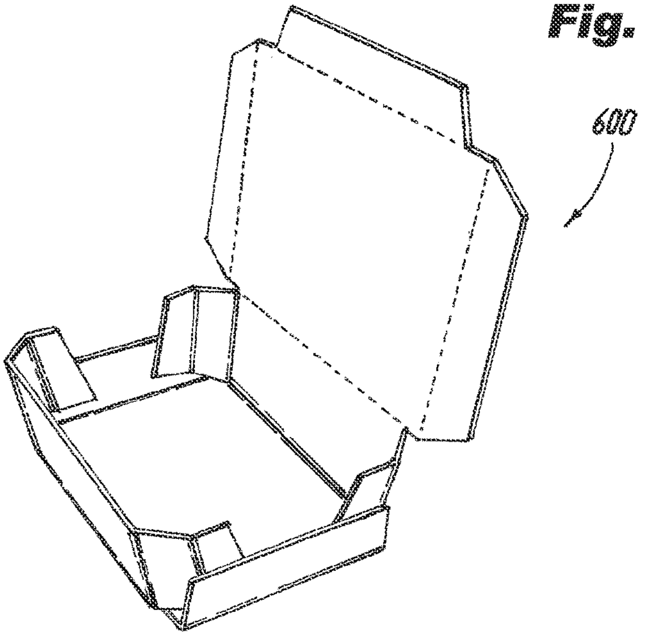
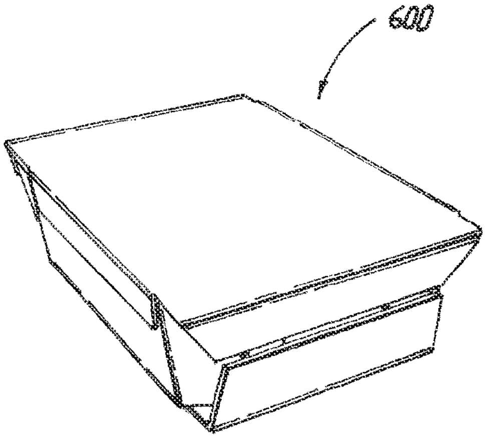
Fig. 26
Fig. 27
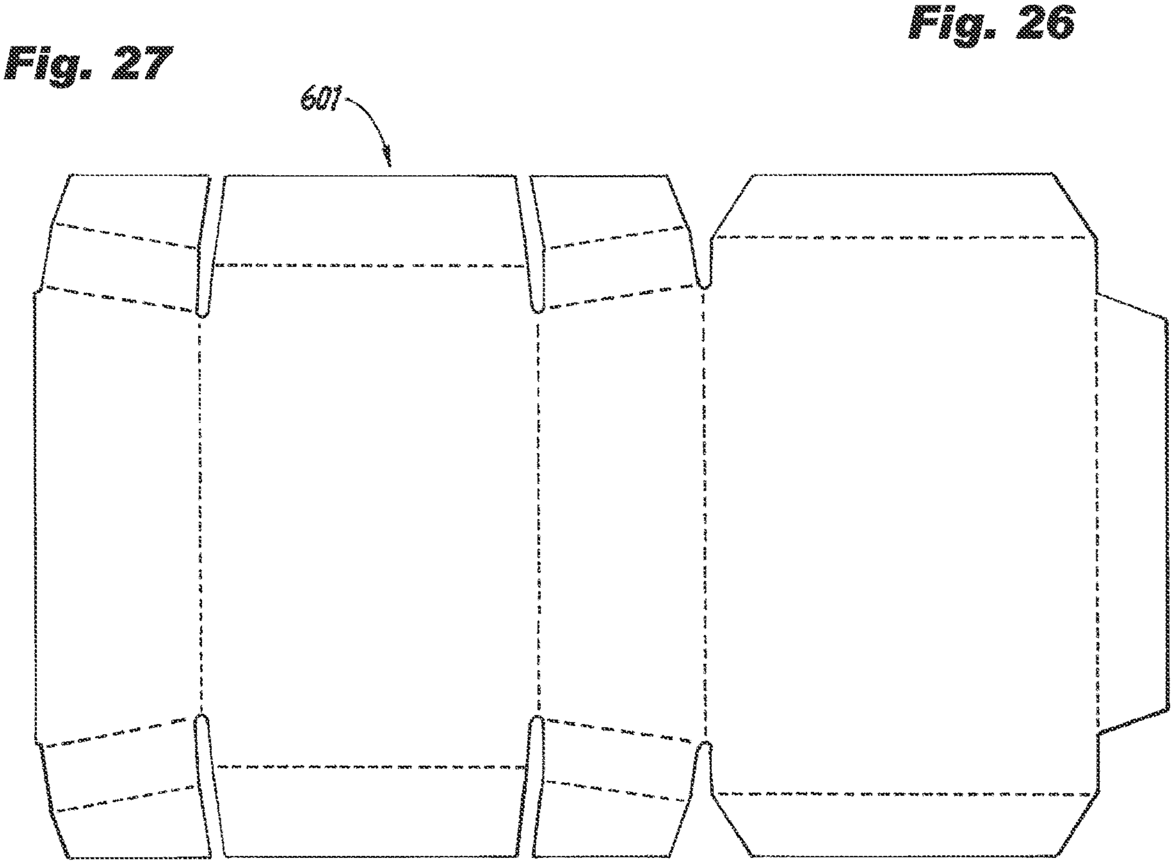

Fig. 28
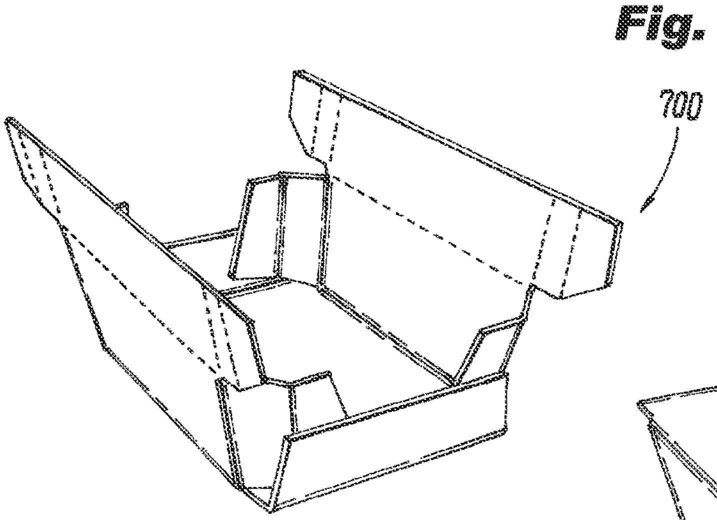
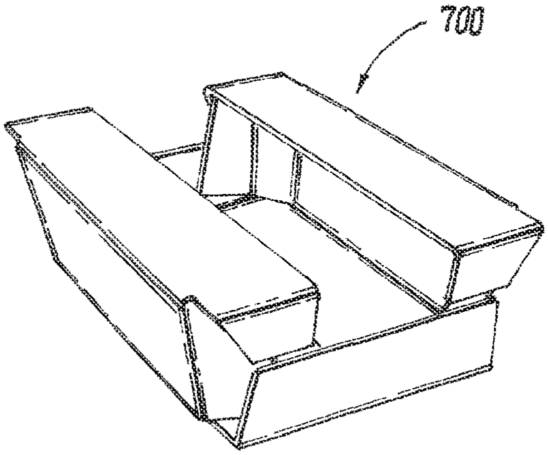
Fig. 29
Fig. 30
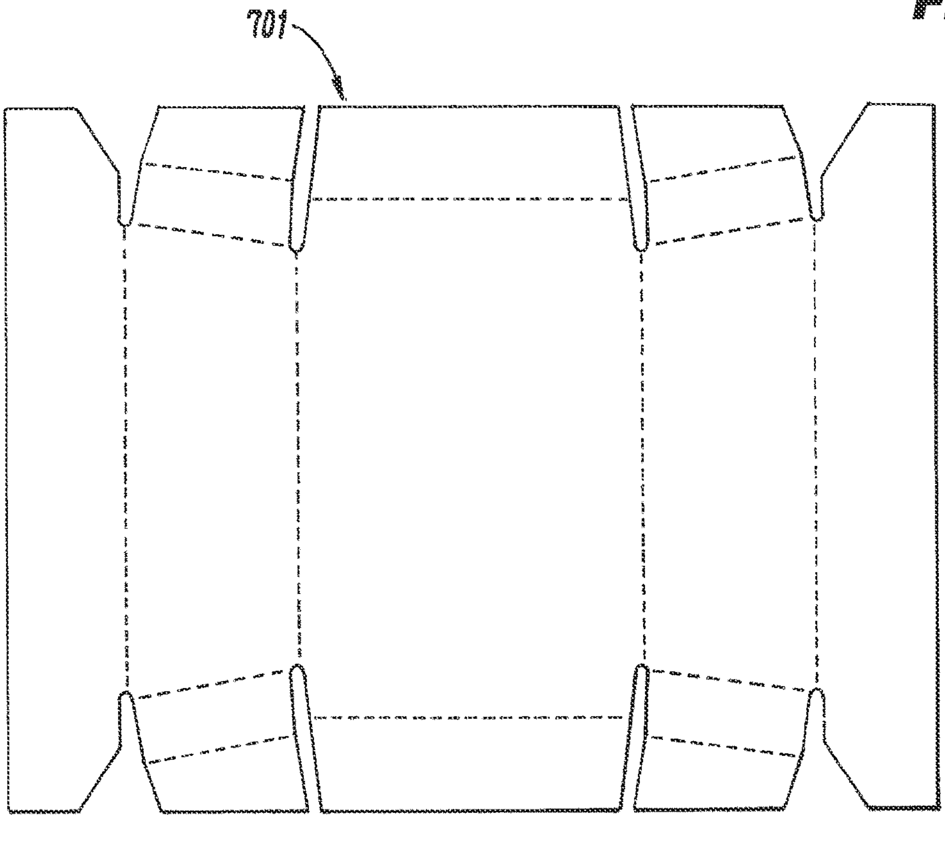

Fig. 44
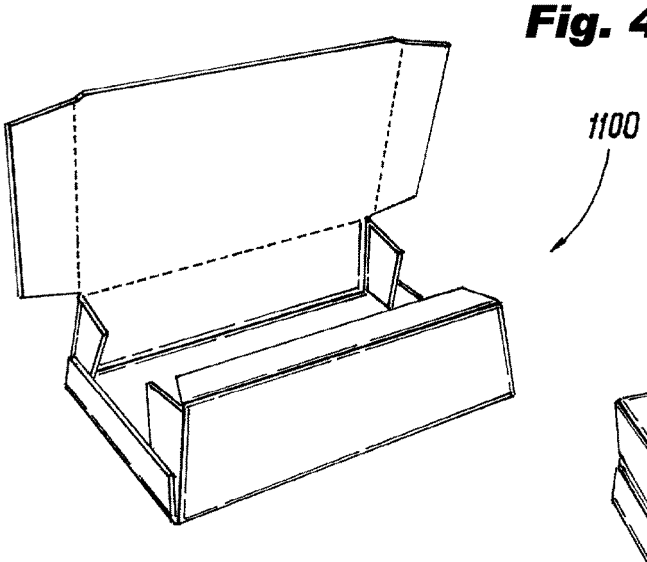
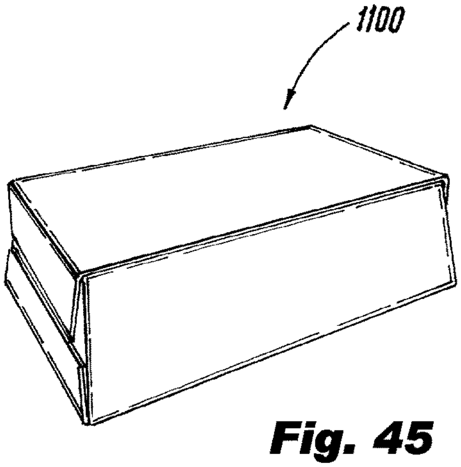
Fig. 45
Fig. 46
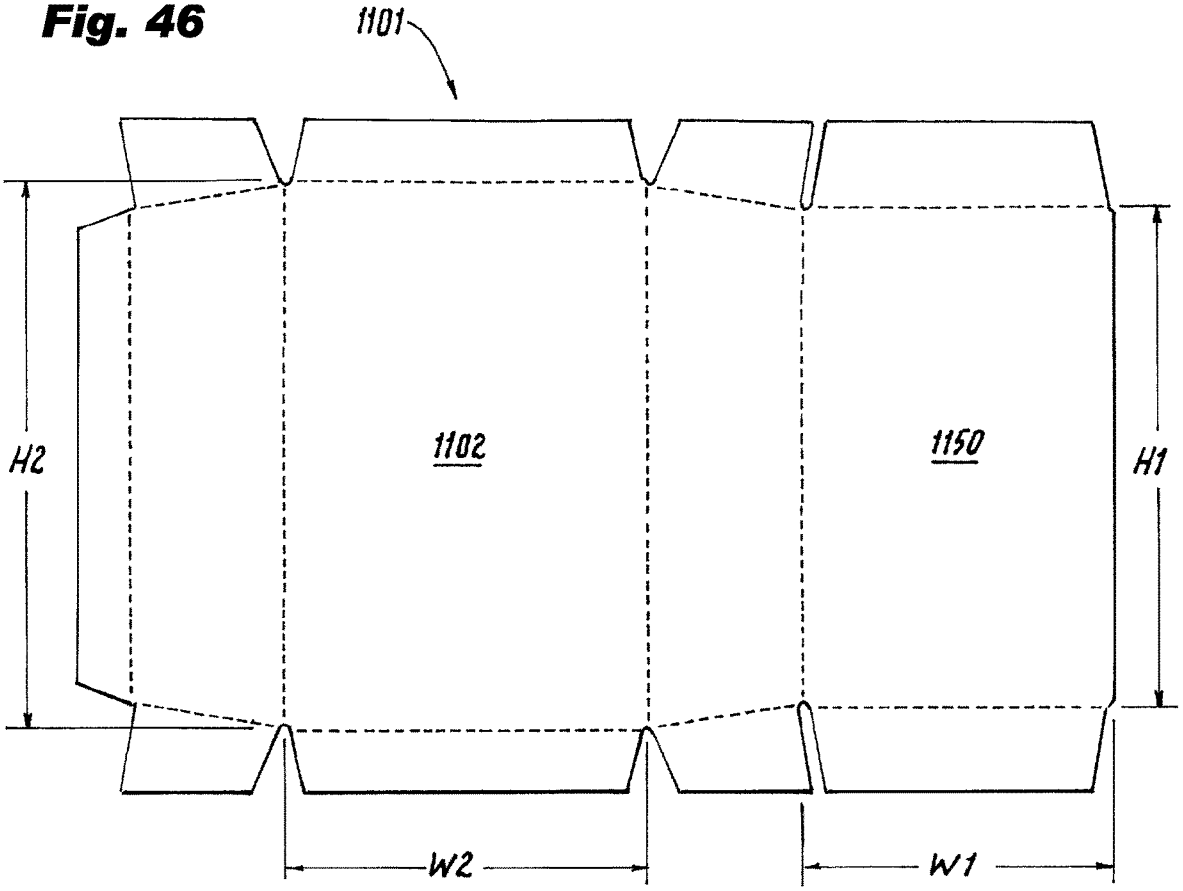

TAPERED END CONTAINERS

BACKGROUND

1. Field

The present disclosure relates to containers, and more particularly to containers for products with non-rectangular form factors.

2. Description of Related Art

Many products have a top footprint that is larger than the base footprint. Tubs of margarine, yogurt, Italian Beef, and other similar products are just a few examples. When packing multiple such products, e.g., multiple tubs of margarine, into a single container, e.g. a single corrugated card board container, certain problems can arise in the automated equipment that forms the container around the products. A gap between the base of the products and the base of the container can prevent proper glue sealing pressure from occurring, resulting in outer base flaps popping open and potentially jamming the line. Even if it does not jam the line, incomplete adhesion of the base flaps can cause other problems such as reduced stackability.

The conventional techniques have been considered satisfactory for their intended purpose. However, there is an ever present need for improved systems and methods for packaging products with non-rectangular form factors. This disclosure provides a solution for this need.

SUMMARY

A container includes a base panel. An opposed pair of end panels extends upward from the base panel at opposite ends of the base panel. A front panel extends upward from the base panel and extends from a first one of the end panels to a second one of the end panels. A back panel extends upward from the base panel and extends from the first one of the end panels to the second one of the end panels. The end panels taper so top edges of the front and back panels are either longer or shorter than bottom edges of the front and back panels. Each end panel includes a plurality of overlapping end flaps adhered to one another. At least some of the end flaps of each of the end panels are connected to a respective one of the base panel and each of the front and back panels at respective fold lines.

Product having a tapered form factor can be contained within an interior space defined by the base panel, the front panel, the back panel, and the end panels. The end panels can be flush against the product.

The front and back panels can taper so the top edges of the front and back panels are farther apart than are the bottom edges of the front and back panels. A top panel can be foldably connected to one of the front or back panels, the top panel being opposed to the base panel, wherein the top panel, base panel, end panels, front panel, and back panel form a wrap container.

A front top panel can be foldably connected to the front panel and opposed to the base panel. A back top panel can be foldably connected to the back panel and opposed to the base panel. The front top panel, back top panel, base panel, end panel, front panel, and back panel can form a harness container. The front top panel and the back top panel can completely enclose an interior space defined within the front panel, pack panel, end panels, and base panel. The front top panel and the back top panel can be spaced apart from one another, leaving an opening therebetween into an interior space defined within the front panel, pack panel, end panels, and base panel.

Each end panel can include: a respective front end flap foldably connected directly to the front panel, a respective back end flap foldably connected directly to the back panel, and a respective base end flap foldably connected directly to the base panel so the front panel, back panel, and end panels form four sides around an interior space.

Each end panel can includes: a respective front end flap foldably connected to the front panel by a front corner panel, a respective back end flap foldably connected to the back panel by a back corner panel, and a respective base end flap foldably connected directly to the base panel so the front panel, back panel, front and back corner panels, and end panels form eight sides around an interior space.

A top lid panel can be foldably connected to the back panel. A front lid panel can be foldably connected to a front edge of the top lid panel opposite the back panel. A pair of opposed side lid panels can each be connected to the top lid panel and front lid panel at opposite ends of the top lid panel, wherein the container is a 6-corner container.

The end panels can taper so the top edges of the front and back panels are longer than bottom edges of the front and back panels. The end panels can taper so the top edges of the front and back panels are shorter than bottom edges of the front and back panels.

A method of forming a container as described above includes folding the front and back panels upward to be upright relative to the base panel and folding a respective base end flap of each end panel downwards relative to the base panel and relative to the upright front and back panels to allow clearance of minor flaps of the end panels. The method includes folding minor flaps of each end panel inward against product, and folding the respective base end flap of each end panel upward and adhering the base end flaps to the minor panels.

A blank for a container includes a base panel. A front panel is foldably connected to the base panel. A back panel is foldably connected to the base panel opposite the front panel. A bottom end flap is foldably connected to the base panel along a bottom fold line. A first minor end flap is foldably connected to the front panel along a first oblique fold line that is oblique relative to the bottom fold line. A second minor end flap is foldably connected to the back panel along a second oblique fold line that is oblique relative to the bottom fold line. The first and second oblique fold lines are defined on lines that converge to a point on the base panel spaced inward from the bottom fold line. The bottom end flap and the first and second minor end flaps are configured to form an end panel that is tapered relative to the base panel. Top edges of the front and back panels are either longer or shorter than bottom edges of the front and back panels.

Bottom edges of the minor end flaps can be oblique relative to the bottom fold line to allow the bottom edges to be flush with the bottom panel in the formed container.

A top panel can be foldably connected to the back panel, the top panel being configured to opposed to the base panel in a wrap container formed from the blank.

A front top panel can be foldably connected to the front panel opposite the base panel. A back top panel can be foldably connected to the back panel opposite the base panel. The front top panel, back top panel, base panel, end panel, front panel, and back panel can be configured to form a harness container. The front top panel and the back top panel can be dimensioned to completely enclose an interior space defined within the front panel, pack panel, end panels, and base panel in a container formed from the blank. The front top panel and the back top panel can be dimensioned to be spaced apart from one another in a container formed from the blank, leaving an opening therebetween into an interior space defined within the front panel, pack panel, end panels, and base panel.

The first minor flap can be a front end flap foldably connected directly to the front panel. The second minor flap can be a respective back end flap foldably connected directly to the back panel. The front panel, back panel, the bottom end flap, and the first and second minor end flaps can be configured to form one end of a container with four sides around an interior space.

The first minor flap can be a front end flap foldably connected to the front panel by a front corner panel. The second minor flap can be a respective back end flap foldably connected to the back panel by a back corner panel. The front panel, back panel, front and back corner panels, and the front and back end flaps can be configured to form one end of a container with eight sides around an interior space.

A top lid panel can be foldably connected to the back panel. A front lid panel can be foldably connected to a front edge of the top lid panel opposite the back panel. A pair of opposed side lid panels can beach each connected to the top lid panel and front lid panel at opposite ends of the top lid panel. The blank can be configured to form a container that is a 6-corner container.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIGS. 1-3 are perspective and plan blank views of an embodiment of a tapered end wrap container constructed in accordance with the present disclosure;

FIGS. 4-6 are perspective and plan blank views of an embodiment of a tapered end harness wrap container constructed in accordance with the present disclosure;

FIGS. 7-9 are perspective and plan blank views of an embodiment of a tapered end harness wrap container constructed in accordance with the present disclosure with a center seam top;

FIGS. 10-12 are perspective and plan blank views of an embodiment of a tapered end harness wrap container constructed in accordance with the present disclosure with full end panels;

FIGS. 13-15 are perspective and plan blank views of an embodiment of an octagonal tapered end wrap container constructed in accordance with the present disclosure;

FIGS. 16-18 are perspective and plan blank views of an embodiment of an octagonal tapered end harness wrap container constructed in accordance with the present disclosure;

FIGS. 19-21 are perspective and plan blank views of an embodiment of an all sides tapered wrap container constructed in accordance with the present disclosure;

FIGS. 22-24 are perspective and plan blank views of an embodiment of an all sides tapered harness wrap container constructed in accordance with the present disclosure;

FIGS. 25-27 are perspective and plan blank views of an embodiment of an all sides tapered octagonal wrap container constructed in accordance with the present disclosure;

FIGS. 28-30 are perspective and plan blank views of an embodiment of an all sides tapered octagonal harness wrap container constructed in accordance with the present disclosure;

FIGS. 44-46 are perspective and plan blank views of an embodiment of an inverted all sides tapered wrap container constructed in accordance with the present disclosure.

DETAILED DESCRIPTION OF THE PREFERRED EMBODIMENTS

Figure 31:
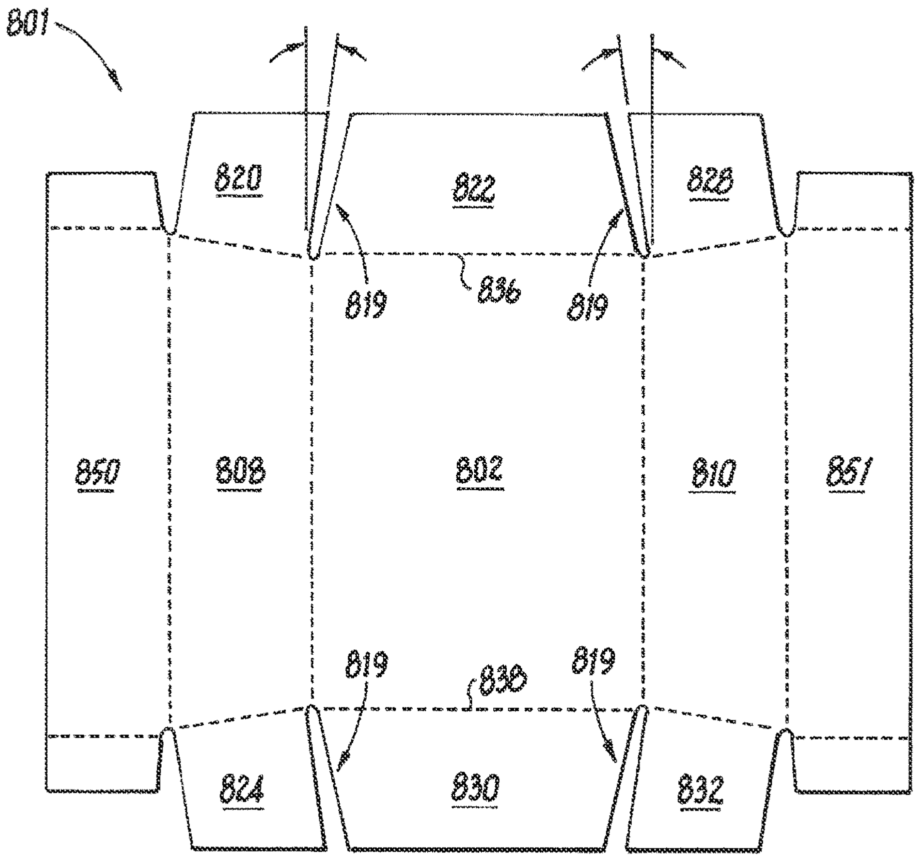
FIGS. 31-37 are perspective and blank views of an embodiment of a full end container, constructed in accordance with the present disclosure, showing a sequence for erecting the container from the blank.

Reference will now be made to the drawings wherein like reference numerals identify similar structural features or aspects of the subject disclosure. For purposes of explanation and illustration, and not limitation, a partial view of an embodiment of a container in accordance with the disclosure is shown in FIG. 1 and is designated generally by reference character 100. Other embodiments of systems in accordance with the disclosure, or aspects thereof, are provided in FIGS. 2-46, as will be described. The systems and methods described herein can be used for packaging products with tapered shapes, to and to improve end flap adhesion during packaging the same.

The container 100 includes a base panel 102. An opposed pair of end panels 104, 106 extends upward from the base panel 102 at opposite ends of the base panel. FIG. 1 shows the container 100 before it is completely closed, so the base panel 102 and end panels 104, 106 are all visible. FIG. 2 shows container 100 completely closed. A front panel 108 extends upward from the base panel 102 and extends from the end panel 104 to the end panel 106. A back panel 110 extends upward from the base panel 102 and extends from the end panel 104 to the end panel 106. The end panels 104, 106 taper out of square relative to the base panel 102 so top edges 112, 114 of the front and back panels 108, 110 are either longer or shorter than the respective bottom edges 116, 118 of the front and back panels 108, 110. Each end panel 106, 104 includes a plurality of overlapping end flaps 120, 122, 124, 126 are adhered and 128, 130, 132, 134, are adhered respectively, to form the respective panels 104, 106. The end flaps 120, 122, 124, and 128, 130, 132, are connected to a respective one of the base panel 102, and each of the front and back panels 108, 110 at respective fold lines, shown in FIG. 3 in broken lines. End flaps 126 and 134 are connected to top panel 150 at respective fold lines.

Referring now to FIG. 3, which shows the blank 101 for making the container 100 of FIGS. 1 and 3, the bottom end flaps 122, 130 are foldably connected to the base panel 102 along respective bottom fold lines 136, 138. First minor end flaps 120, 128 are foldably connected to the front panel along respective first oblique fold lines 140, 142 that are each oblique relative to the bottom fold lines 136, 138. Second minor end flaps 124, 132 are foldably connected to the back panel 110 along respective second oblique fold lines 144, 146 that are oblique relative to the bottom fold lines 136, 138. The first and second oblique fold lines 140, 144 are defined on lines that converge to a point 148 on the base panel 102 spaced inward from the bottom fold line 136. The same can be said of the third and fourth oblique fold lines 142, 146 and the bottom fold line 138. The bottom end flap 122 and the first and second minor end flaps 120, 124 are configured to form an end panel 104 (shown in FIGS. 1 and 2) that is tapered relative to the base panel 102, i.e. the end panel 104 is defined along a plane that is obliquely angled relative to the bottom panel 102. The opposite end panel 106 (shown in FIGS. 1 and 2) is similarly made of the bottom end flap 130 and the first and second minor end flaps 128, 132. A top panel 150 is foldably connected to one of the front or back panels, in FIGS. 1-3 it is connected to the back panel 110 but could be instead connected to the front panel 108. The top panel 150 is opposed to the base panel in the container 100, wherein the top panel 150, base panel 102, end panels 104, 106, front panel 108, and back panel 110 form a wrap container 100.

As shown in FIG. 1, product 154 having a tapered form factor is contained within an interior space defined by the base panel 102, the front panel 108, the back panel 110, and the end panels 104, 106. The end panels 104, 106 are flush against the product 154, which facilitates forming the end panels 104, 106 including helping ensure complete adhesion of the flaps that make up the end panels 104, 106. The top flaps 126, 134, 152 are each foldably connected to the top panel 150 and are each adhered to respective ones of the front and end panels 104, 106, 108.

It is contemplated that the top flap 152 can be moved to the opposite edge of the front panel 108 and can be adhered to the inside surface of the top panel 150 instead of the configuration of FIG. 2. Moreover, while the bottom flaps 130 and 122 are shown in FIG. 1 as only extending part of the way to the top of the end panels 104, 106, it is contemplated that they can be configured to extend all the way to the top.

With reference now to FIGS. 4-6, another container 200 and corresponding blank 201 are described. Whereas the container 100 in FIGS. 1-3 is a wrap style container, the container 200 is a harness style container. The base, front, back, and side panels 202, 208, 210, 204, 206 are similar to those described above with respect to container 100, but there are two opposed top panels 250, 251. A front top panel 251 is foldably connected to the front panel 208 and opposed to the base panel 202 in the erected container 200 as shown in FIGS. 4-5. A back top panel 250 is foldably connected to the back panel 210 and is also opposed to the base panel 202. The front top panel 251 and the back top panel 250 can be configured to be separated by a gap 253, which can be of any suitable size for a given application in product. However, it is also contemplated that the top panels 251, 250 can be configured to completely enclose an interior space defined within the front panel, pack panel, end panels, and base panels 202, 208, 210, 204, 206, as shown in FIGS. 7-9. It is also contemplated that while the containers 200 shown in FIGS. 4-9 have partial end panels 204, 206, i.e. due to shorter height in the bottom flaps 222, 230 in the erected containers 200, the bottom flaps 222, 230 can be longer to provide full-height end panels 204, 206 as shown in FIGS. 10-12.

With reference now to FIGS. 13-15, another container 300 and corresponding blank 301. Whereas in FIGS. 1-4, each end panel 106, 104 includes a plurality of overlapping end flaps 120, 122, 124, 126 and 128, 130, 132, 134, that together with the front and back panels 108, 110 form four sides around an interior space for containing product, an interior of container 300 can be eight sided. For example, it is contemplated that the part of the blank 301 including the front and back panels 308, 310, as well as minor end flaps 120, 121, 124, 125, 128, 129, 133, 134, the blank configuration can be octagonal, however the base and top panels 302, 350, as well as the respective flaps connected to thereto may not be octagonal. Thus it is possible to have a rectangular package footprint while the internal flaps form an octagonal cavity, e.g. as shown in FIG. 14 for example. The basic panels 302, 308, 310, 350 are much as described above with FIGS. 1-4. However, each end panel 304, 306 includes: a respective front end flap 120, 128 foldably connected to the front panel 308 by a respective front corner panel 121, 129. Similarly on the back end, each respective back end flap 124, 134 is foldably connected to the back panel 310 by a respective back corner panel 125, 133. It is possible that the corner panels 121, 129, 125, 133 can add four sides to the perimeter of the container 300 as shown in FIGS. 13-14 so the front panel 308, back panel 310, front and back corner panels 121, 129, 125, 133, and end panels 304, 306 form a perimeter with a total of eight sides around the interior space, while the base and top panels 302, 350 can maintain rectangular. The end panels 304, 306 can be partial as shown in FIG. 13, or full as in FIGS. 10-12. It is also contemplated that while the container 300 in FIGS. 13-15 is shown as a wrap container, it can also be configured as a harness container as shown in FIGS. 16-18 with any suitable gap between the top panels 350, 351 or no gap much as described above with respect to FIGS. 4-9.

With reference now to FIGS. 19-21, another container 400 and corresponding blank is described. The containers 100, 200, 300 described above all have tapered end panels, e.g. end panels 104, 106, but all have front and back panels, e.g. front and back panels 108, 110 in FIG. 1, that are perpendicular relative to their respective base panel, e.g. base panel 102 in FIG. 1. In container 400, all four sides taper. In addition to the end panels 404 and 406 (which are made of pluralities of panels much as described above) tapering, the front and back panels 408, 410 also taper obliquely relative to the base panel 402. The top panel 450 has a larger height H2 than the height H1 of the base panel 402, much as in containers 100, 200, 300 described above, but additionally, the top panel 450 has a larger width W2 than the width W1 of the base panel 102, meaning the top edges 412, 414 are further apart than the bottom edges 416, 418. While FIGS. 19-21 show a container 400 with all sides tapered in a wrap configuration, the all sides tapering can be applied to a harness wrap container and blank 500, 501 as shown in FIGS. 22-24 (with any suitable gap or lack thereof as described above with respect to FIGS. 4-9). Also, the four main sides of an octagonal container and blank 600, 601 can be tapered as shown in FIGS. 25-27 in a wrap style, or in a harness stile as in the container and blank 700, 701 of FIGS. 28-30, which are otherwise similar to the containers 300 described above, thus it is possible to have a rectangular package footprint while the internal flaps form an octagonal cavity. Any of the four-sides tapered containers 400, 500, 600, 700 can have full or partial end panels, as described above with reference to FIGS. 4 and 10. Also, any of the wrap style containers, e.g. container 600, can have inside or outside gluing of the top panel as described with respect to FIGS. 1-3.

Figure 32:
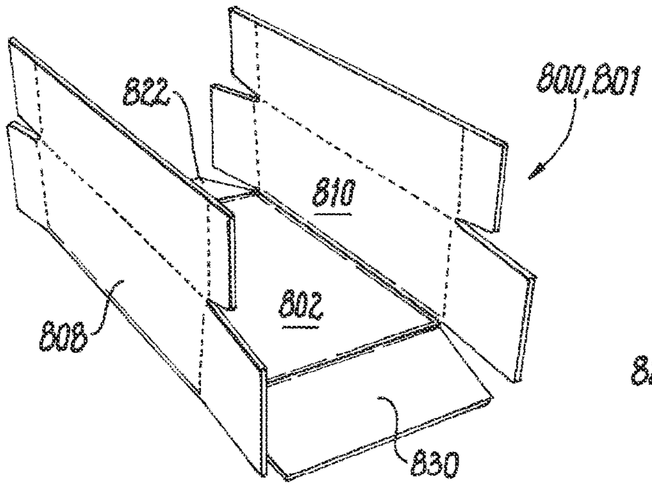
Figure 34:
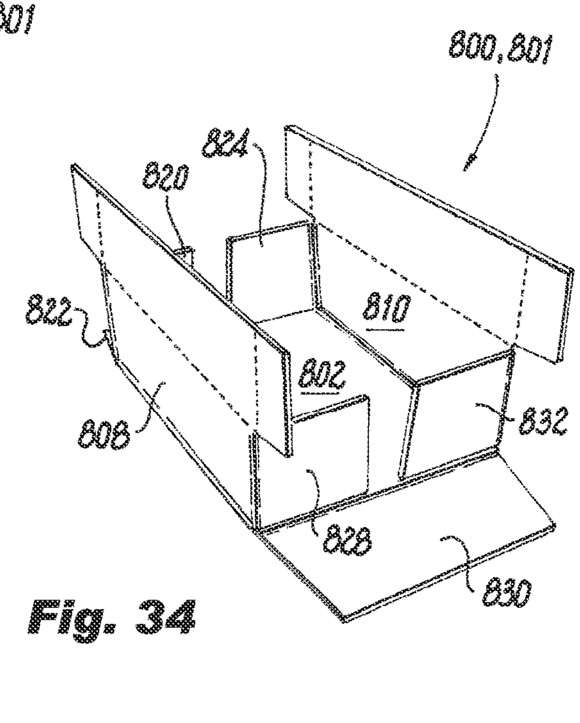
Figure 33:
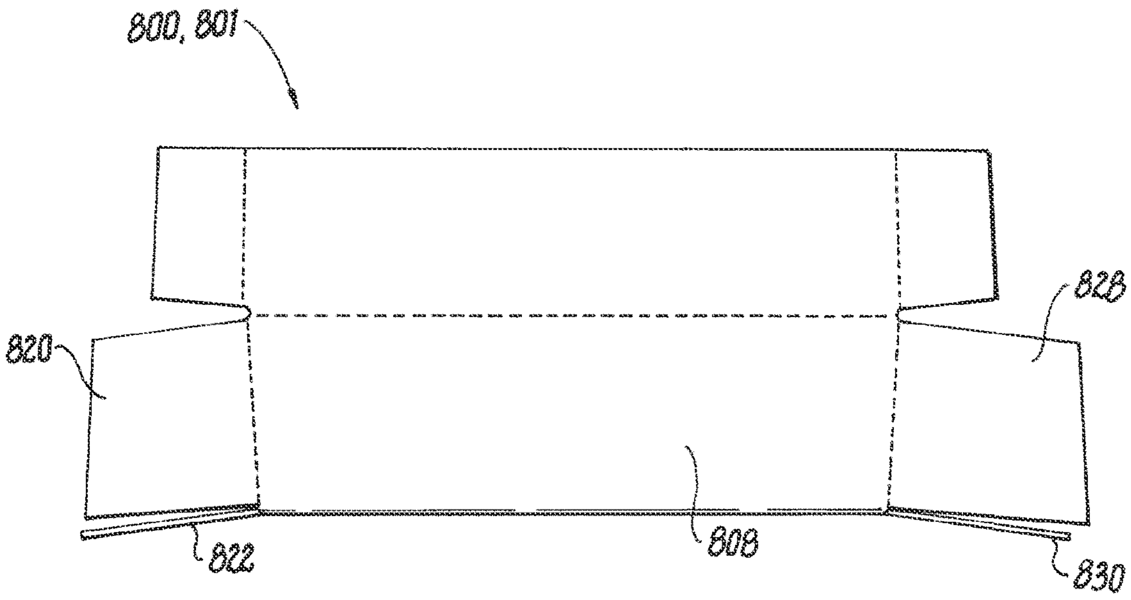
Figure 35:
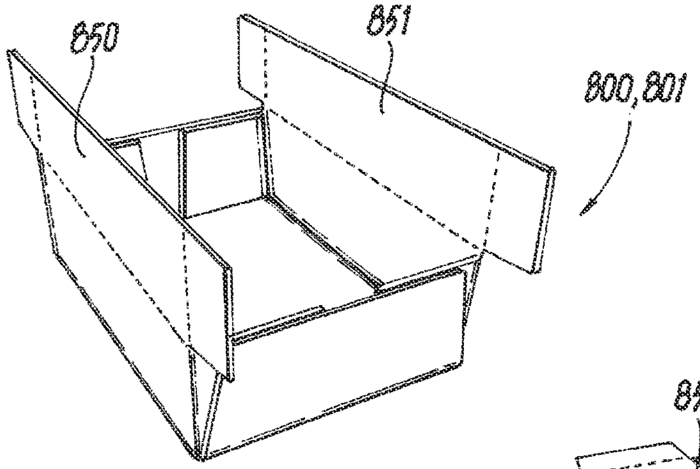
Figure 36:
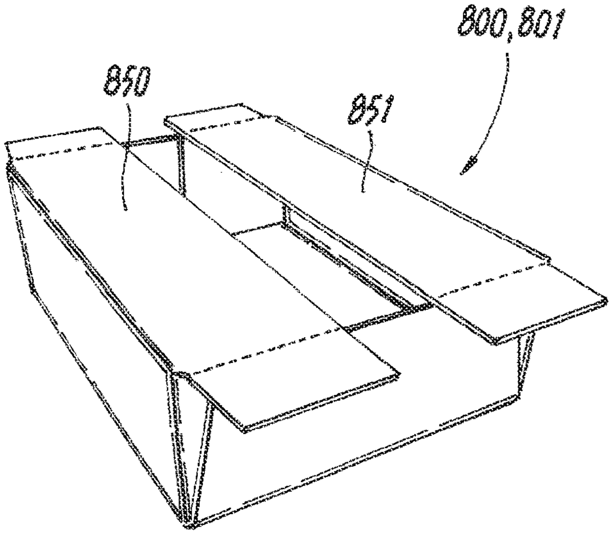
Figure 37:
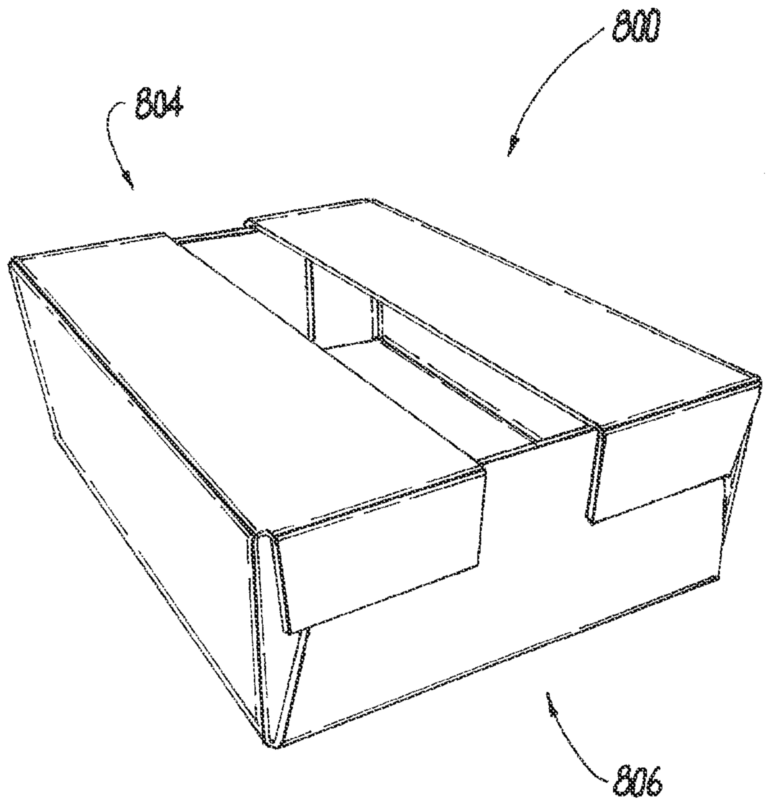

Referring now to FIGS. 31-37, another container and blank 800, 801 is shown with full support minor corners for added stacking strength, e.g. if multiple containers 800 are stacked. Bottom edges 819 of the minor end flaps 820, 824, 828, 832 are oblique relative to the respective bottom fold lines 836, 838 as shown by the angle indicators in FIG. 31. This allows the bottom edges 819 to be flush with the bottom panel 802 in the formed container 800 as shown in FIG. 37. As shown in FIG. 32, in erecting the blank 801 into a container 800, the method includes folding the front and back panels 808, 810 upward, e.g. around product, to be upright relative to the base panel 802. As shown in FIGS. 32 and 34, the method includes folding the respective base end flap 822, 830 of each end panel 804, 806 downwards relative to the base panel 802 and relative to the upright front and back panels 808, 810 to allow clearance of minor end flaps 820, 824, 828, 832. As shown in FIG. 33, the method includes folding minor end flaps 820, 824, 828, 832 inward against the product (which is not shown in FIG. 33 but see FIG. 1), and folding the respective base end flap 822, 830 upward as shown in FIG. 35 and adhering the base end flaps 822, 830 to the respective minor end panels 820, 824, 828, 832. The top panels 850, 851 are then folded into place as shown in FIG. 36, and their respective end flaps are folded down and adhered to form the container 800 as shown in FIG. 37. As shown in FIG. 33, since the minor end flaps 820, 824, 828, 832 have edges 819 flush with the bottom panel 820, and unnumbered top edges flush with the top panels 850, 851, the minor end flaps 820, 824, 828, 832 can contribute considerably load bearing capabilities at the corners for the container, adding to stacking strength. This full support minor corner configuration is applied to the two tapered end, harness style container 800, but can also be applied to wrap style containers, as well as containers where four sides taper as described above.

Figure 38:
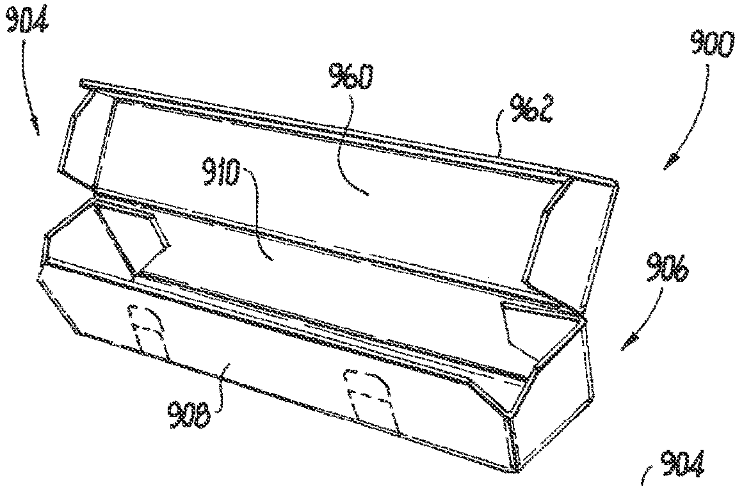
FIGS. 38-40 are perspective and plan blank views of an embodiment of six-corner tray end tapered container constructed in accordance with the present disclosure.
Figure 39:
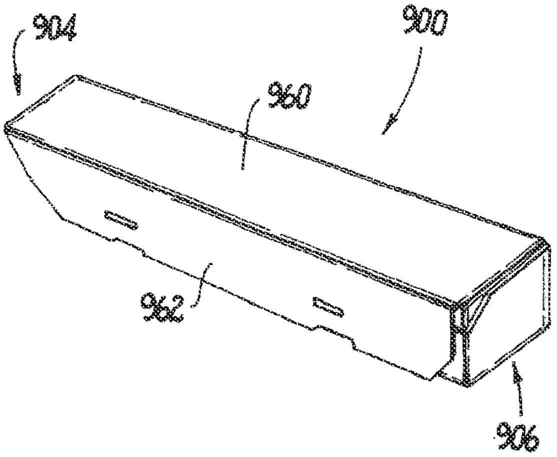
Figure 40:
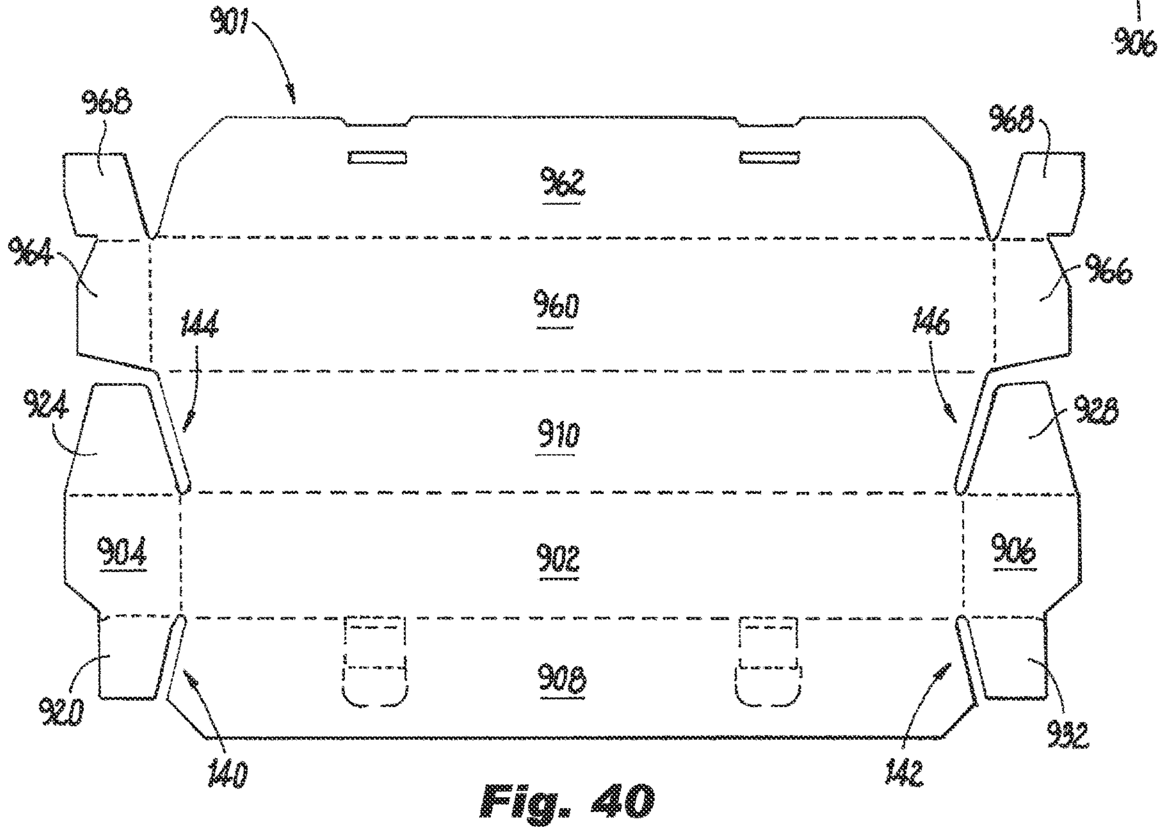

With reference now to FIGS. 38-40, a container and blank 900, 901 are shown and described with a six-corner tray configuration with tapered end panels 904, 906. A base panel 902 has end panels 904 and 906 foldably connected at either end of base panel 902. The minor end flaps 920, 924, 928, 932 are foldably connected to the respective end panels 904, 906 and are adhered to the respective front and back panels 908, 910 in the erected container 900. The tapered edges 140, 142, 144, 146 of the front and back panels 908, 910 give the end panels 904, 906 their taper relative to the base panel 902 much as described above with respect to FIGS. 1-3. A top lid panel 960 is foldably connected to the back panel 910. A front lid panel 962 is foldably connected to a front edge of the top lid panel 920 opposite the back panel 910. A pair of opposed side lid panels 964, 966 are each foldably connected to the top lid panel 960 and have respective end flaps 968 that are adhered to the front lid panel 962 at opposite ends of the top lid panel 960.

Figure 41:
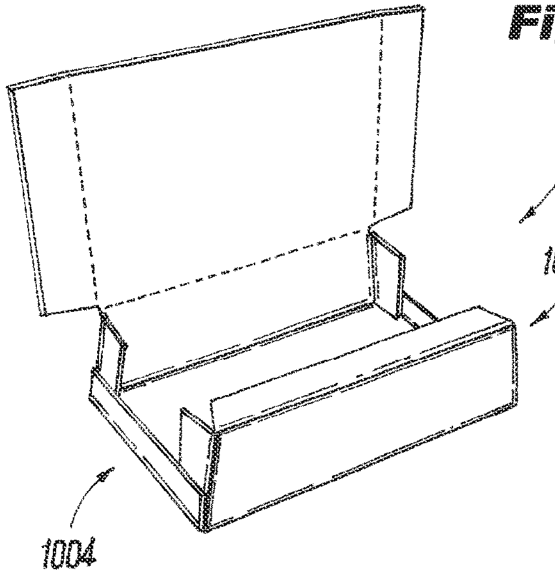
FIGS. 41-43 are perspective and plan blank views of an embodiment of an inverted end tapered wrap container constructed in accordance with the present disclosure.
Figure 42:
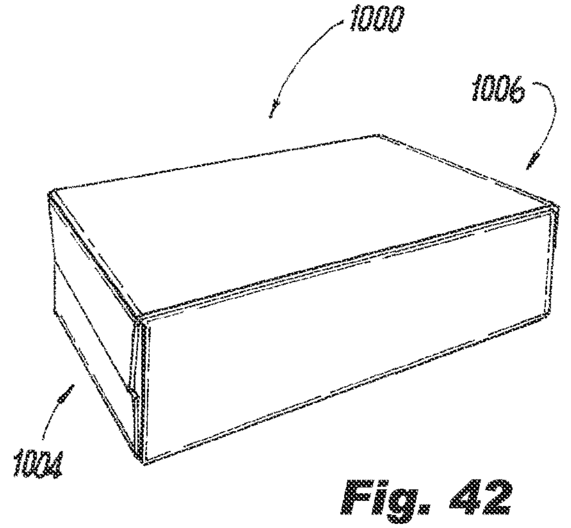
Figure 43:
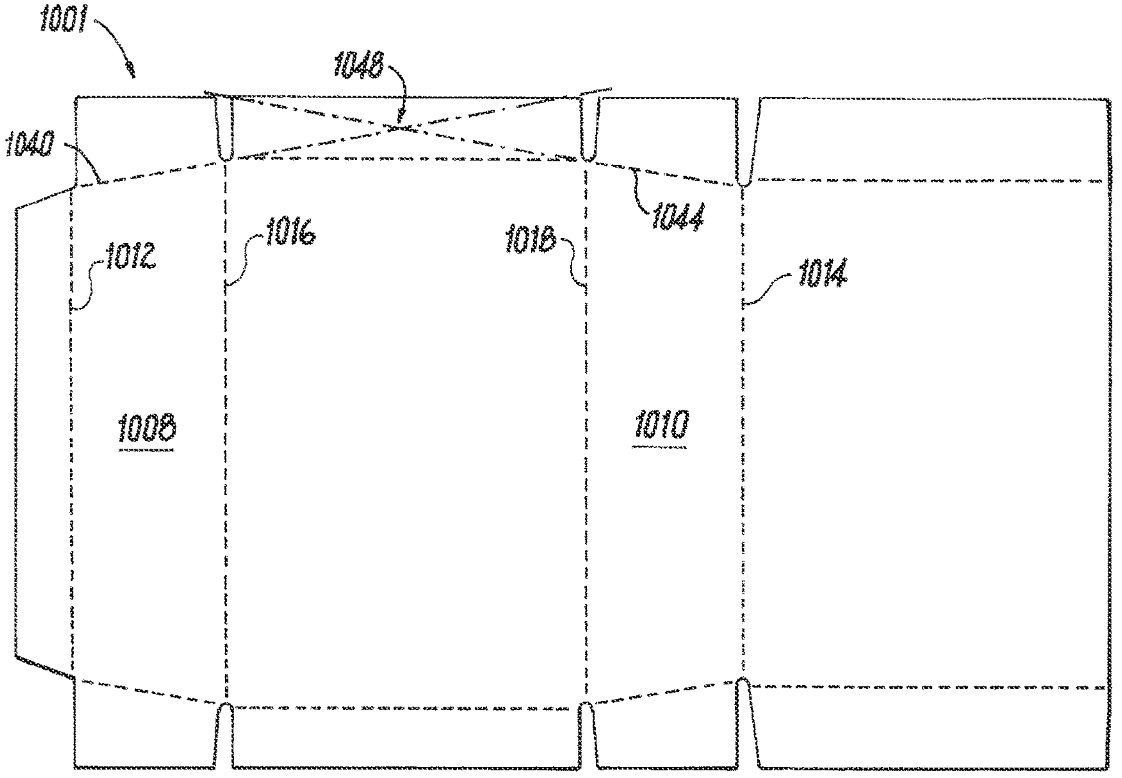

With reference now to FIGS. 41-43, another container 1000 and respective blank 1001 are shown. While in FIG. 1, the base panel 102 is larger than the top panel 150, and the end panels 204, 206 taper so the top edges 112, 114 of the front and back panels 108, 110 are longer than bottom edges 116, 118, the opposite is true in container 1000. The end panels 1004, 1006 taper so the top edges 1012, 1014 of the front and back panels 1008, 1010 are shorter than bottom edges of the front and back panels 1008, 1010. Similar to that shown in FIG. 3, in FIG. 43, oblique fold lines 1040, 1044 are defined on lines that converge to a point 1048 on the end flap 1022 spaced outward from the bottom fold line 1036. There is also a four-tapered sides container 1100 and corresponding blank 1101 shown in FIGS. 44-46, where the top panel 1150 has a longer length L1 and wider width W1 than those (L2, W2) of the base panel 1102. These inverted taper containers 1000, 1100 are suitable for packaging product that has a reverse tapered shape, or that has a normal tapered shape but benefits from being stored upside down, e.g. if it contains fluids that separate and therefore benefit from upside-down storage. Any of the foregoing container configurations can be adapted to be reverse tapered as are containers 1000, 1100.

The methods and systems of the present disclosure, as described above and shown in the drawings, provide for packaging products with tapered shapes, to and to improve end flap adhesion during packaging the same. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A container formed from a blank, the container comprising:

a base panel;

an opposed pair of end panels extending upward from the base panel at opposite ends of the base panel;

a front panel extending upward from the base panel and extending from a first one of the end panels to a second one of the end panels; and a back panel extending upward from the base panel and extending from the first one of the end panels to the second one of the end panels, wherein the end panels taper so top edges of the front and back panels are either longer or shorter than bottom edges of the front and back panels, wherein each end panel includes a plurality of overlapping end flaps, wherein the plurality of overlapping end flaps, when the container is in the blank form, having a gap between at least one of the overlapping end flaps and adjacent one of the overlapping end flaps, wherein the end flaps are adhered to one another, wherein at least some of the end flaps of each of the end panels are connected to a respective one of the base panel and each of the front and back panels at respective fold lines, wherein the front and back panels taper so the top edges of the front and back panels are farther apart than are the bottom edges of the front and back panels.

2. The container as recited in claim 1, further comprising product having a tapered form factor, wherein the product is contained within an interior space defined by the base panel, the front panel, the back panel, and the end panels, wherein the end panels are flush against the product.

3. The container as recited in claim 1, further comprising a top panel foldably connected to one of the front or back panels, the top panel being opposed to the base panel, wherein the top panel, base panel, end panels, front panel, and back panel form a wrap container.

4. The container as recited in claim 1, further comprising:

a front top panel foldably connected to the front panel and opposed to the base panel; and a back top panel foldably connected to the back panel and opposed to the base panel, wherein the front top panel, back top panel, base panel, end panel, front panel, and back panel form a harness container.

5. The container as recited in claim 4, wherein the front top panel and the back top panel completely enclose an interior space defined within the front panel, pack panel, end panels, and base panel.

6. The container as recited in claim 4, wherein the front top panel and the back top panel are spaced apart from one another, leaving an opening therebetween into an interior space defined within the front panel, pack panel, end panels, and base panel.

7. The container as recited in claim 1, wherein each end panel includes:
- a respective front end flap foldably connected directly to the front panel;
- a respective back end flap foldably connected directly to the back panel; and
- a respective base end flap foldably connected directly to the base panel so the front panel, back panel, and end panels form four sides around an interior space.

8. The container as recited in claim 1, wherein each end panel includes:
- a respective front end flap foldably connected to the front panel by a front corner panel;
- a respective back end flap foldably connected to the back panel by a back corner panel; and
- a respective base end flap foldably connected directly to the base panel so the front panel, back panel, front and back corner panels, and end panels form eight sides around an interior space.

9. The container as recited in claim 1, further comprising a top lid panel foldably connected to the back panel, a front lid panel foldably connected to a front edge of the top lid panel opposite the back panel, and a pair of opposed side lid panels each connected to the top lid panel and front lid panel at opposite ends of the top lid panel, wherein the container is a 6-corner container.

10. The container as recited in claim 9, wherein the end panels taper so the top edges of the front and back panels are longer than bottom edges of the front and back panels.

11. The container as recited in claim 10, wherein the end panels taper so the top edges of the front and back panels are shorter than bottom edges of the front and back panels.

12. The blank as recited in claim 10, wherein the top edges of the front and back panels are shorter than the bottom edges of the front and back panels.

13. The blank as recited in claim 9, wherein the top edges of the front and back panels are longer than bottom edges of the front and back panels.

14. A method of forming a container as recited in claim 1 comprising:
- folding the front and back panels upward to be upright relative to the base panel;
- folding a respective base end flap of each end panel downwards relative to the base panel and relative to the upright front and back panels to allow clearance of minor flaps of the end panels so that product may be moved into position between the front and back panels and onto the base panel;
- folding minor flaps of each end panel inward against product; and
- folding the respective base end flap of each end panel upward and adhering the base end flaps to the minor panels.

15. A blank for a container comprising
- a base panel;
- a front panel foldably connected to the base panel;
- a back panel foldably connected to the base panel opposite the front panel;
- a bottom end flap foldably connected to the base panel along a bottom fold line;
- a first minor end flap foldably connected to the front panel along a first oblique fold line that is oblique relative to the bottom fold line; and
- a second minor end flap foldably connected to the back panel along a second oblique fold line that is oblique relative to the bottom fold line, wherein the first and second oblique fold lines are defined on lines that converge to a point on the base panel spaced inward from the bottom fold line, and wherein the bottom end flap and the first and second minor end flaps are configured to form an end panel that is tapered relative to the base panel, and wherein top edges of the front and back panels are either longer or shorter than bottom edges of the front and back panels, wherein length of the first minor end flap measured along its fold line is greater than height of the bottom end flap measured from the bottom fold line to a free end edge of the bottom end flap opposite the bottom fold line, wherein the front and back panels taper so the top edges of the front and back panels are farther apart than are the bottom edges of the front and back panels.

16. The blank as recited in claim 15, wherein bottom edges of the minor end flaps are oblique relative to the bottom fold line to allow the bottom edges to be flush with the bottom panel in the formed container.

17. The blank as recited in claim 15, further comprising a top panel foldably connected to the back panel, the top panel being configured to opposed to the base panel in a wrap container formed from the blank.

18. The blank as recited in claim 15, further comprising:
- a front top panel foldably connected to the front panel opposite the base panel; and
- a back top panel foldably connected to the back panel opposite the base panel, wherein the front top panel, back top panel, base panel, end panel, front panel, and back panel are configured to form a harness container.

19. The blank as recited in claim 18, wherein the front top panel and the back top panel are dimensioned to completely enclose an interior space defined within the front panel, pack panel, end panels, and base panel in a container formed from the blank.

20. The blank as recited in claim 18, wherein the front top panel and the back top panel are dimensioned to be spaced apart from one another in a container formed from the blank, leaving an opening therebetween into an interior space defined within the front panel, pack panel, end panels, and base panel.

21. The blank as recited in claim 15, wherein the first minor flap is a front end flap foldably connected directly to the front panel;
- wherein the second minor flap is a respective back end flap foldably connected directly to the back panel; and
- wherein the front panel, back panel, the bottom end flap, and the first and second minor end flaps are configured to form one end of a container with four sides around an interior space.

22. The blank as recited in claim 15,
- wherein the first minor flap is a front end flap foldably connected to the front panel by a front corner panel;
- wherein the second minor flap is a respective back end flap foldably connected to the back panel by a back corner panel; and
- wherein the front panel, back panel, front and back corner panels, and the front and back end flaps are configured to form one end of a container with eight sides around an interior space.

23. The blank as recited in claim 15, further comprising a top lid panel foldably connected to the back panel, a front lid panel foldably connected to a front edge of the top lid panel opposite the back panel, and a pair of opposed side lid panels each connected to the top lid panel and front lid panel at opposite ends of the top lid panel, wherein the blank is configured to form a container that is a 6-corner container.

* * * * *